(12) United States Patent
Whaley (10) Patent No.: US 10,355,460 B2
(45) Date of Patent: Jul. 16, 2019

(54) SWITCHGEAR WITH CIRCUIT BREAKER BAY(S)

(71) Applicant: Quanta Associates, L.P., Houston, TX (US)

(72) Inventor: Dane Whaley, Crete, IL (US)

(73) Assignee: Quanta Associates, L. P., Houston, TX (US)

( * ) Notice: Subject to any disclaimer, the term of this patent is extended or adjusted under 35 U.S.C. 154(b) by 0 days.

(21) Appl. No.: 15/993,710

(22) Filed: May 31, 2018

(65) Prior Publication Data

US 2018/0351335 A1 Dec. 6, 2018

Related U.S. Application Data

(60) Provisional application No. 62/513,748, filed on Jun. 1, 2017.

(51) Int. Cl.
| | |
|---|---|
| *H02B 1/20* | (2006.01) |
| *H02B 5/00* | (2006.01) |
| *H02B 5/06* | (2006.01) |
| *H02B 1/24* | (2006.01) |
| *H01H 33/02* | (2006.01) |

(52) U.S. Cl.
CPC ............ *H02B 5/06* (2013.01); *H02B 1/202* (2013.01); *H02B 1/24* (2013.01); *H02B 5/00* (2013.01); *H01H 33/025* (2013.01)

(58) Field of Classification Search
CPC ........... H02B 1/011; H02B 1/202; H02B 5/00
See application file for complete search history.

(56) References Cited

U.S. PATENT DOCUMENTS

| | | | | | |
|---|---|---|---|---|---|
| 1,884,580 | A | * | 10/1932 | Corneliussen | H02B 5/00 200/48 R |
| 1,989,782 | A | * | 2/1935 | Anderson | H02B 5/00 361/602 |

(Continued)

FOREIGN PATENT DOCUMENTS

| | | | | | |
|---|---|---|---|---|---|
| EP | | 1039605 A1 | * | 9/2000 | ............... H02B 5/00 |
| GB | | 265360 A | * | 2/1927 | ............... H02B 5/00 |
| WO | WO-9748156 A1 | * | 12/1997 | ............... H02B 5/00 |

*Primary Examiner* — Robert J Hoffberg
(74) *Attorney, Agent, or Firm* — Murphy, Bilak & Homiller, PLLC (57) ABSTRACT

Switchgear comprises a support structure that supports one or more bus conductors. The bus conductor(s) each extend longitudinally in a bus direction. The switchgear further includes one or more circuit breaker bays. Each circuit breaker bay comprises feeder cable terminal(s) configured to respectively terminate feeder cable(s). Each circuit breaker bay further comprises a circuit breaker that is spaced from the feeder cable terminal(s) in the bus direction, and that comprises terminal pair(s). Each pair includes a bus-side terminal via which the circuit breaker connects to a respective bus conductor and a feeder-side terminal via which the circuit breaker connects to a respective feeder cable terminal. The circuit breaker is also configured to selectively interrupt current between the bus-side terminal and the feeder-side terminal of each terminal pair. The bus-side terminal and the feeder-side terminal of each terminal pair are spaced from one another in the bus direction.

23 Claims, 10 Drawing Sheets

(56) References Cited

U.S. PATENT DOCUMENTS

| | | | | |
|---|---|---|---|---|
| 3,215,897 A | * | 11/1965 | Hertig | H02B 5/00 361/602 |
| 3,364,398 A | * | 1/1968 | Stipcevich | H02B 5/00 307/147 |
| 3,556,310 A | * | 1/1971 | Loukotsky | E04H 12/10 211/189 |
| 4,092,547 A | * | 5/1978 | Ruppert | H02B 5/00 307/113 |
| 6,215,653 B1 | * | 4/2001 | Cochran | H02B 5/00 361/602 |
| 6,678,151 B2 | * | 1/2004 | Costante | H02B 5/00 200/48 P |
| 8,441,778 B1 | * | 5/2013 | Ashmore | H02B 5/00 307/113 |
| 2014/0192454 A1 | * | 7/2014 | Ashmore | H02B 5/00 361/602 |

* cited by examiner

SWITCHGEAR WITH CIRCUIT BREAKER BAY(S)

RELATED APPLICATIONS

The present application claims benefit of U.S. Provisional Application 62/513,748, filed Jun. 1, 2017, the disclosure of which is incorporated herein by reference in its entirety.

TECHNICAL FIELD

Embodiments of the present application relate generally to switchgear for use in an electric power system, and specifically to switchgear for use in an electrical substation.

BACKGROUND

In an electric power system, switchgear protects and/or isolates electrical equipment. Active parts of the switchgear must be separated by a minimum clearance distance, which increases as the switched voltage increases, to prevent electric arcs from developing between the active parts. Especially for medium or higher voltages (e.g., 1 kV+), the minimum clearance distance threatens to increase requirements on the switchgear's physical footprint. This larger footprint, especially in the vertical dimension, in turn demands more construction cost and materials (e.g., more concrete for support, more insulators, etc.), as well as jeopardizes the ease of switchgear maintenance and operation (e.g., by requiring longer hooksticks).

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

Embodiments herein include switchgear for use in an electric power system. The switchgear includes components that are configured or arranged in some embodiments so as to reduce the footprint (e.g., in the vertical dimension) of the switchgear, as compared to existing approaches. This may in turn reduce construction cost and materials, and better facilitate switchgear maintenance and operation.

More particularly, some embodiments include switchgear that comprise a support structure, one or more bus conductors, and one or more circuit breaker bays. The one or more bus conductors are each supported by the support structure and that each extend longitudinally in a bus direction. Each circuit breaker bay comprises one or more feeder cable terminals and a circuit breaker. The one or more feeder cable terminals of each circuit breaker bay are configured to respectively terminate one or more feeder cables. The circuit breaker of each circuit breaker bay is spaced from the one or more feeder cable terminals in the bus direction, comprises one or more terminal pairs with each pair including a bus-side terminal via which the circuit breaker connects to a respective bus conductor and a feeder-side terminal via which the circuit breaker connects to a respective feeder cable terminal, and is configured to selectively interrupt current between the bus-side terminal and the feeder-side terminal of each of the one or more terminal pairs. The bus-side terminal and the feeder-side terminal of each of the one or more terminal pairs are spaced from one another in the bus direction.

In some embodiments, the switchgear comprises multiple bus conductors spaced from one another in a direction transverse to the bus direction and each circuit breaker bay comprises multiple feeder cable terminals configured to respectively terminate multiple feeder cables. In this case, the circuit breaker of each circuit breaker bay may comprise multiple terminal pairs. The bus-side terminals included in different terminal pairs are spaced from one another in a direction transverse to the bus direction, and the feeder-side terminals included in different terminal pairs are spaced from one another in a direction transverse to the bus direction.

In one or more embodiments, the circuit breaker of each circuit breaker bay comprises multiple terminal pairs. In this case, the bus-side terminal and the feeder-side terminal of each of the terminal pairs may be aligned in the bus direction, the bus-side terminals included in different terminal pairs may be aligned in a direction transverse to the bus direction, and the feeder-side terminals included in different terminal pairs may be aligned in a direction transverse to the bus direction.

In some embodiments, for each circuit breaker bay, the one or more feeder cables are each fed under ground to a feed point from which the one or more feeder cables emerge and directly connect to respective feeder cable terminals of the circuit breaker bay. The feed point may be located under the one or more bus conductors, and the one or more feeder cable terminals may each be supported by the support structure that supports the one or more bus conductors extending in the bus direction.

In some embodiments, each circuit breaker bay in some embodiments further comprises one or more feeder-side disconnect switches and one or more feeder-side jumper cables extending longitudinally in the bus direction. The one or more feeder-side jumper cables may be configured to respectively connect one or more feeder-side terminals of the circuit breaker, via the one or more feeder-side disconnect switches, to the one or more feeder cable terminals. Alternatively or additionally, each circuit breaker bay in some embodiments further comprises one or more bus-side disconnect switches and one or more bus-side jumper cables extending longitudinally in the bus direction. The one or more bus-side jumper cables are configured to respectively connect one or more bus-side terminals of the circuit breaker, via the one or more bus-side disconnect switches, to the one or more bus conductors. In still other embodiments, each circuit breaker bay in some embodiments comprises the one or more feeder-side disconnect switches, the one or more feeder-side jumper cables, the one or more bus-side disconnect switches, and the one or more bus-side jumper cables.

In some embodiments, each circuit breaker bay comprises multiple feeder-side disconnect switches, multiple bus-side disconnect switches, multiple feeder-side jumper cables, and multiple bus-side jumper cables. In this case, the feeder-side disconnect switches may be spaced from one another in a direction transverse to the bus direction and the bus-side disconnect switches may be spaced from one another in a direction transverse to the bus direction. Further, the bus-side jumper cables may be spaced from one another in a direction transverse to the bus direction and the feeder-side jumper cables may be spaced from one another in a direction transverse to the bus direction.

Alternatively or additionally, each of the one or more bus-side disconnect switches and each of the one or more feeder-side disconnect switches are underhung from the support structure in some embodiments.

In these or other embodiments, each of the one or more bus-side disconnect switches and each of the one or more feeder-side disconnect switches may comprise a hookstick operated switch that has a switch blade which extends in the bus direction when the switch blade is in a closed position.

Alternatively or additionally, each of the one or more bus-side disconnect switches and each of the one or more feeder-side disconnect switches may comprise a hookstick operated switch mounted from the support structure such that an eye of the hookstick operated switch is disposed no more than 15 feet above a bottom of the support structure when a switch blade of the hookstick operated switch is in a closed position.

In still other embodiments, the support structure may comprise a support frame formed from a row of vertical props connected by cross-members. In this case, the cross-members may extend in the bus direction and may be spaced from one another in the direction transverse to the bus direction. Each vertical prop may comprise vertical members connected by one or more horizontal members extending in the direction transverse to the bus direction. Each of the one or more horizontal members may be shorter in length than the cross-members. Each circuit breaker bay of the switchgear may have a vertical prop on opposite sides of the circuit breaker in the bus direction.

In any of these embodiments, the support structure may have a height that is no more than 20 feet.

According to yet other embodiments herein, switchgear comprises one or more bus conductors, a support structure, and one or more circuit breaker bays. The one or more bus conductors each extend longitudinally in a bus direction. The support structure supports the one or more bus conductors. Each circuit breaker bay comprises one or more feeder cable terminals and a circuit breaker. The one or more feeder cable terminals are supported by the support structure and are configured to respectively terminate one or more feeder cables that are fed under ground to a feed point from which the one or more feeder cables emerge and directly connect to a respective feeder cable terminal. The feed point may be located within an area of ground spanned by the support structure. The circuit breaker may also be located within the area of ground spanned by the support structure, and may be spaced from the one or more feeder cable terminals in the bus direction. The circuit breaker is configured to interrupt current between the one or more bus conductors and the one or more feeder cable terminals.

In some embodiments, the support structure may comprise a support frame formed from a row of vertical props connected by cross-members. In this case, the cross-members may extend in the bus direction and may be spaced from one another in the direction transverse to the bus direction. Each vertical prop may comprise vertical members connected by one or more horizontal members extending in the direction transverse to the bus direction. Each of the one or more horizontal members may be shorter in length than the cross-members. Each circuit breaker bay of the switchgear may have a vertical prop on opposite sides of the circuit breaker in the bus direction.

Alternatively or additionally, for each circuit breaker, the frame further has inner horizontal members that extend between the cross-members on different sides of the circuit breaker. In this case, each circuit breaker bay in some embodiments further comprises feeder-side disconnect switches that are each underhung from one of the inner horizontal members, bus-side disconnect switches that are each underhung from one of the inner horizontal members, or both feeder-side disconnect switches and bus-side disconnect switches that are each underhung from one of the inner horizontal members. Each of the bus-side disconnect switches and each of the feeder-side disconnect switches may comprises a hookstick operated switch that has a switch blade which extends in the bus direction when the switch blade is in a closed position.

In some embodiments, the switchgear comprises multiple circuit breaker bays disposed in a row in the bus direction. In this case, at least one feed point from which the one or more feeder cables of a circuit breaker bay emerge may be disposed at a boundary between that circuit breaker bay and an adjacent circuit breaker bay in the row.

In one or more embodiments, the support structure has a height that is no more than 20 feet.

In still other embodiments, switchgear comprises bus conductors, a support structure, and one or more circuit breaker bays. The bus conductors each extend longitudinally in a bus direction and are spaced from one another in a direction transverse to the bus direction. The support structure is configured to support the bus conductors. The support structure comprises a support frame formed from a row of vertical props that are spaced along the bus direction and that are connected by cross-members. The cross-members extend in the bus direction and are spaced from one another in the direction transverse to the bus direction. Each vertical prop comprises vertical members connected by one or more horizontal members extending in the direction transverse to the bus direction. Each of the one or more horizontal members are shorter in length than the cross-members. Each circuit breaker bay comprises feeder cable terminals configured to respectively terminate feeder cables, and a circuit breaker that is spaced from the feeder cable terminals in the bus direction and that is configured to interrupt current between the bus conductors and the feeder cable terminals. The circuit breaker has a vertical prop on opposite sides of the circuit breaker in the bus direction.

In some embodiments, for each circuit breaker, the frame further has inner horizontal members that extend between the cross-members on different sides of the circuit breaker. In this case, each circuit breaker bay in some embodiments further comprises feeder-side disconnect switches that are each underhung from one of the inner horizontal members, bus-side disconnect switches that are each underhung from one of the inner horizontal members, or both feeder-side disconnect switches and bus-side disconnect switches that are each underhung from one of the inner horizontal members. Each of the bus-side disconnect switches and each of the feeder-side disconnect switches may comprises a hookstick operated switch that has a switch blade which extends in the bus direction when the switch blade is in a closed position.

In one or more embodiments, the support structure has a height that is no more than 20 feet.

DETAILED DESCRIPTION

Figure 1:
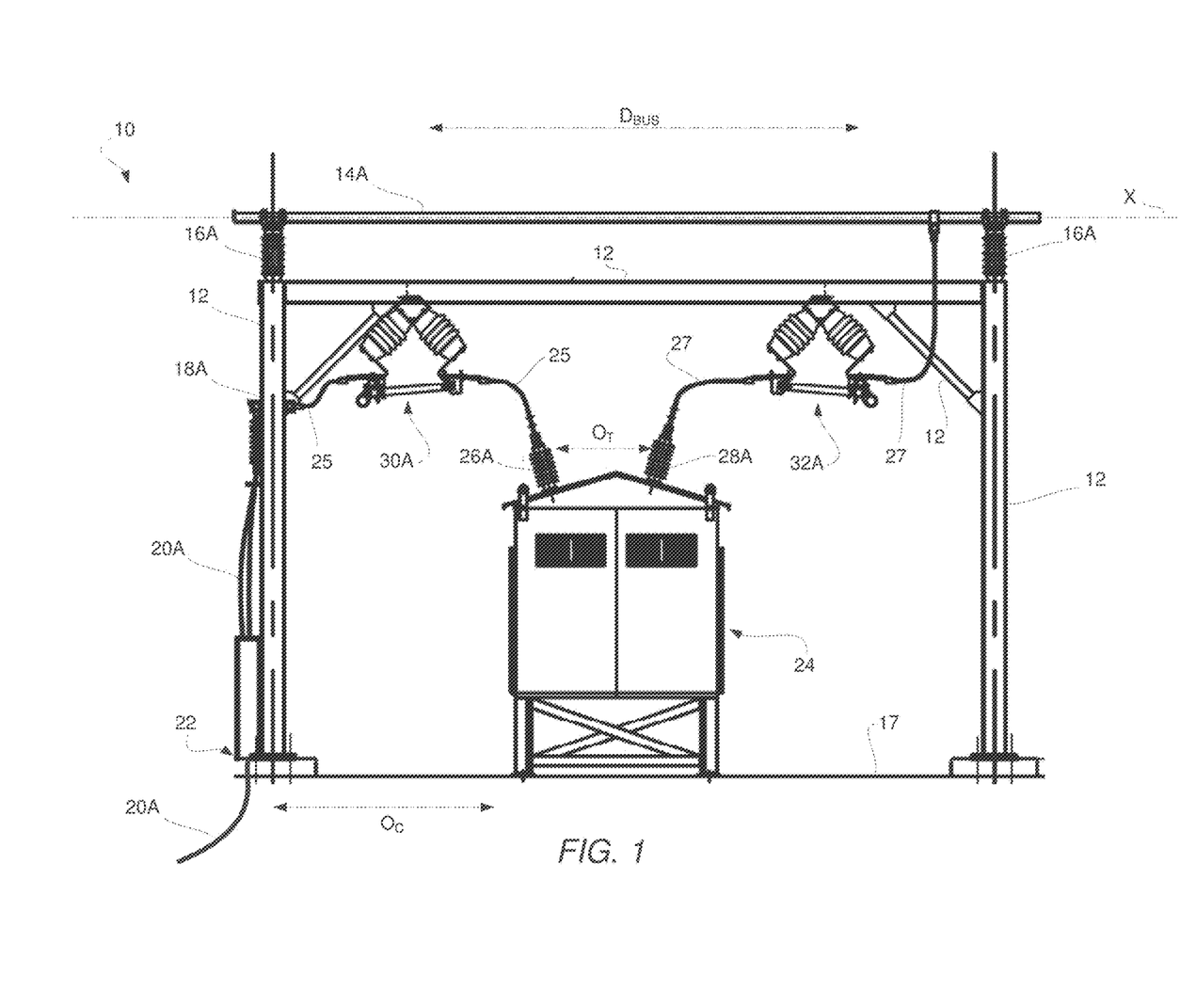
FIG. 1 is a front view of a circuit breaker bay of switchgear according to some embodiments.

FIG. 1 illustrates switchgear that includes one or more circuit breaker bays (e.g., disposed in a row), one of which is shown as circuit breaker bay 10. The switchgear may for instance be air-insulated, operate at medium or high voltages (e.g., +1 kV), and/or be included as part of an electrical utility substation. The switchgear includes a support structure 12 shown as an elongated support frame. The switchgear also includes a bus conductor 14A. The support structure 12 supports the bus conductor 14A, e.g., atop insulators 16A. The bus conductor 14A extends longitudinally in a so-called bus direction $D_{BUS}$, which as shown is substantially horizontal so as to be substantially parallel to the ground 17 or horizon (e.g., +/−10 degrees). In embodiments where the bus conductor 14A is a busbar as shown, for instance, the bus direction $D_{BUS}$ is in the direction of the busbar's major axis X.

The circuit breaker bay 10 of the switchgear in FIG. 1 includes a feeder cable terminal 18A. The feeder cable terminal 18A is configured to terminate a feeder cable 20A. The feeder cable terminal 18A in this regard may provide an interconnection point between the feeder cable 20A and a different type of cable via which current may flow between the feeder cable 20A and the bus conductor 14A.

The circuit breaker bay 10 further includes a circuit breaker 24 that is configured to interrupt current between the bus conductor 14A and the feeder cable terminal 18A. The circuit breaker 24 may for instance be located within the area of ground spanned by the support structure 12, e.g., located under the bus conductor 14A on a ground-bearing concrete slab.

The circuit breaker 24 is spaced from the feeder cable terminal 18A in the bus direction $D_{BUS}$. FIG. 1 in this regard shows the circuit breaker 24 and feeder cable terminal 18A are separated by an offset $O_C$ in the bus direction $D_{BUS}$. The spacing or offset may for instance be dimensioned as needed to satisfy minimum clearance requirements between active parts of the switchgear.

These and other embodiments may thereby exploit spacing in the bus direction $D_{BUS}$ (e.g., to a greater extent than known approaches) in order to satisfy minimum clearance requirements between at least some components of the switchgear. In some embodiments, exploiting spacing in the bus direction $D_{BUS}$ in this way advantageously minimizes or at least reduces the vertical footprint of the switchgear, as compared to known approaches that rely to a greater extent on spacing in the vertical direction. The height of the switchgear in some embodiments, for example, is no more than 20 feet. Reducing the vertical footprint of the switchgear in turn reduces construction materials and costs, since for example less steel (e.g., 53% less), fewer insulators, and less substantial concrete footers (e.g., 45% less) may be required in some embodiments.

In fact, some embodiments herein further exploit spacing in the bus direction $D_{BUS}$ such that the connection from the feeder cable terminal 18A to the bus conductor 14A generally or primarily flows in the bus direction $D_{BUS}$. More specifically in this regard, the circuit breaker 24 as shown in FIG. 1 includes a pair of terminals between which the circuit breaker 24 is configured to interrupt current. The terminal pair as shown includes a feeder-side terminal 26A via which the circuit breaker 24 connects to the feeder cable terminal 18A (e.g., using one or more feeder-side jumper cables 25) and a bus-side terminal 28A via which the circuit breaker 24 connects to the bus conductor 14A (e.g., using one or more bus-side jumper cables 27). FIG. 1 shows that the feeder-side terminal 26A and the bus-side terminal 28A of the terminal pair are also spaced from one another in the bus direction $D_{BUS}$. In particular, feeder-side terminal 26A and bus-side terminal 28A are separated by an offset $O_T$ in the bus direction $D_{BUS}$. The circuit breaker's feeder-side and bus-side terminals 26A, 28A may even be substantially aligned in the bus direction $D_{BUS}$.

This spacing or offset in some embodiments means that the terminals 26A, 28A, and 18A are aligned or otherwise oriented such that the feeder cable 20A may be connected to the bus conductor 14A using jumper cables 25, 27 that primarily extend (horizontally) in the bus direction $D_{BUS}$, e.g., the length spanned by the jumper cables 25, 27 in the bus direction $D_{BUS}$ may be greater than the length spanned by the jumper cables 25, 27 in the vertical direction. With the connection from the feeder cable terminal 18A to the bus conductor 14A primarily extending in the bus direction $D_{BUS}$, such advantageously minimizes or at least reduces the vertical footprint and thereby construction materials and cost of the switchgear.

FIG. 1 also shows that some embodiments alternatively or additionally run the feeder cable 20A underground all the way to the circuit breaker bay 10 and/or the support structure 12 that supports the bus conductor 14A. Indeed, in some embodiments, the feeder cable 20A is run under the ground 17 to a feed point 22 from which the feeder cable 20A emerges and directly connects to the feeder cable terminal 18A. The feed point 22 in some embodiments is located within the area of ground spanned by the support structure 12 (e.g., within a footprint of the support structure 12 when the support structure 12 is projected straight down onto the ground 17). Running the feeder cable 20A underground to this extent (e.g., to within the structure's footprint) obviates the need to "bus" the feeder cable connection (above ground) into the support structure 12. Since such a bus would impose additional structural requirements for supporting the bus and impose additional clearance requirements, especially in the vertical direction if the bus were to terminate above the circuit breaker 24, these embodiments may advantageously reduce the vertical footprint and construction materials/cost of the switchgear.

Figure 2:
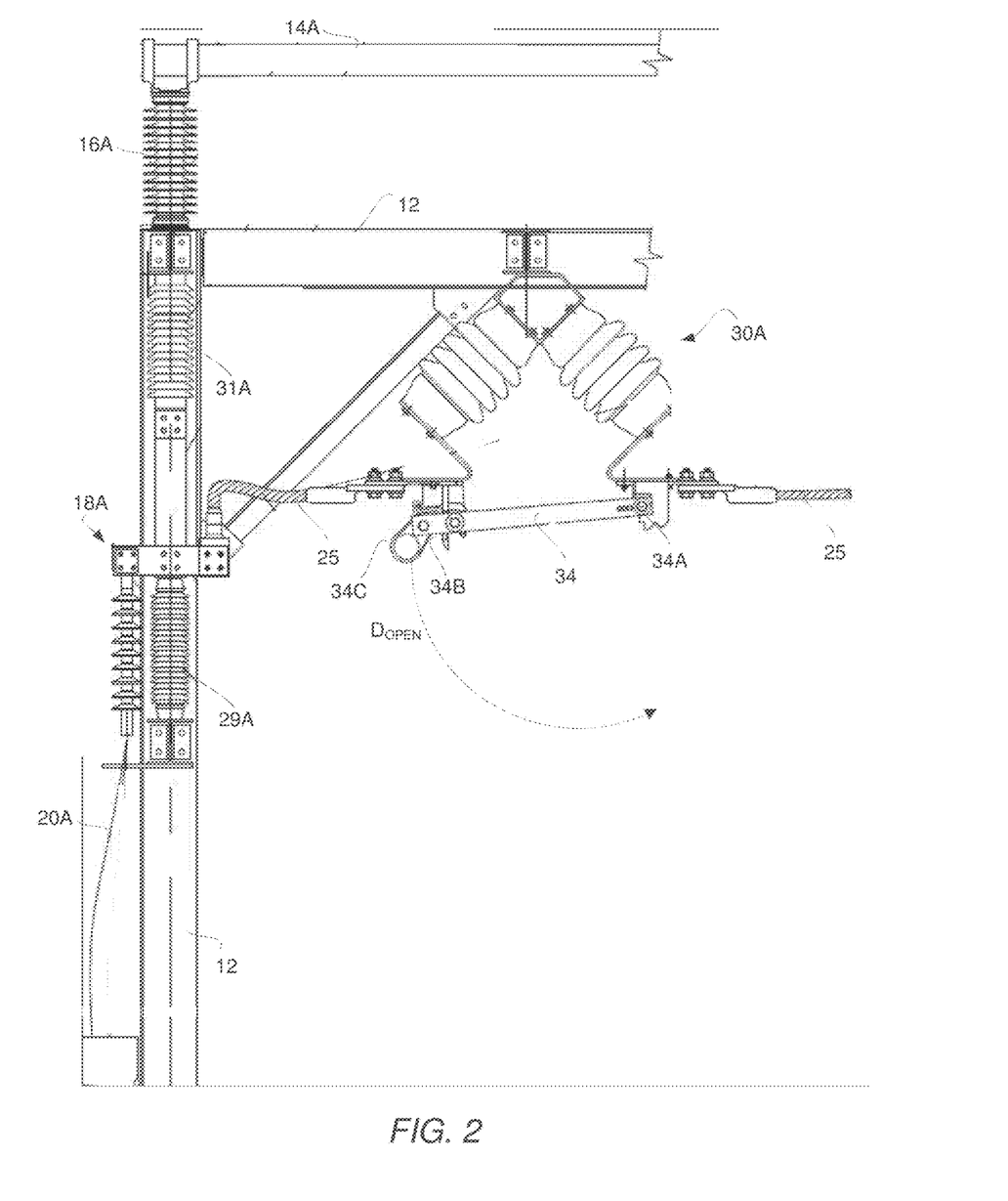
FIG. 2 is a detailed front view of a feeder-side portion of the circuit breaker bay of FIG. 1.

Some embodiments herein further reduce construction cost and materials by exploiting the same support structure that supports the bus conductor 14A for also supporting the feeder cable terminal 18A. Indeed, the feeder cable terminal 18A as shown in FIG. 1 is supported by the support structure 12. For example, the feeder cable terminal 18A may be mounted on and/or from the support structure 12, e.g., via one or more insulators. FIG. 2 illustrates one example of such an embodiment.

As shown in FIG. 2, the feeder cable terminal 18A in some embodiments is formed from a conducting bar (e.g., an aluminum bar) that is mounted above an insulator 29A and below a surge arrester 31A, each of which is supported by the support structure 12. The feeder cable 20A is connected to one end of this conducting bar. A jumper cable 25 is connected to the other end of the conducting bar for connection towards the bus conductor 14A. Alternative implementations of the feeder cable terminal 18A are envisioned in other embodiments, though, for generally interconnecting the feeder cable 20A to the rest of the breaker bay 10.

No matter the particular form of the feeder cable terminal 18A, though, the feeder cable 20A notably terminates at the same support structure 12 that supports the bus conductor 14A. Accordingly, although embodiments herein include the feeder cable terminal 18A being a standalone terminal disembodied from the support structure 14a, some embodiments effectively "re-use" the support structure 12 in order to also support the feeder cable terminal 18A and thereby reduce overall construction cost and materials.

Further, some embodiments also exploit the support structure 12 for supporting disconnect switches 30A, 32A. As shown in FIG. 1, for example, the circuit breaker bay 10 includes a feeder-side disconnect switch 30A for selectively disconnecting the circuit breaker 24 from the feeder cable 18A and a bus-side disconnect switch 32A for selectively disconnecting the circuit breaker 24 from the bus conductor 14A. The feeder-side jumper cable 25 extends longitudinally in the bus direction $D_{BUS}$ and connects the circuit breaker's feeder-side terminal 26A, via the feeder-side disconnect switch 30A, to the feeder cable terminal 18A. Similarly, the bus-side jumper cable 27 extends longitudinally in the bus direction $D_{BUS}$ and connects the circuit breaker's bus-side terminal 28A, via the bus-side disconnect switch 32A, to the bus conductor 14A. In any event, FIG. 1 shows that the disconnect switches 30A, 32A are underhung from the support structure 12.

Figure 3:
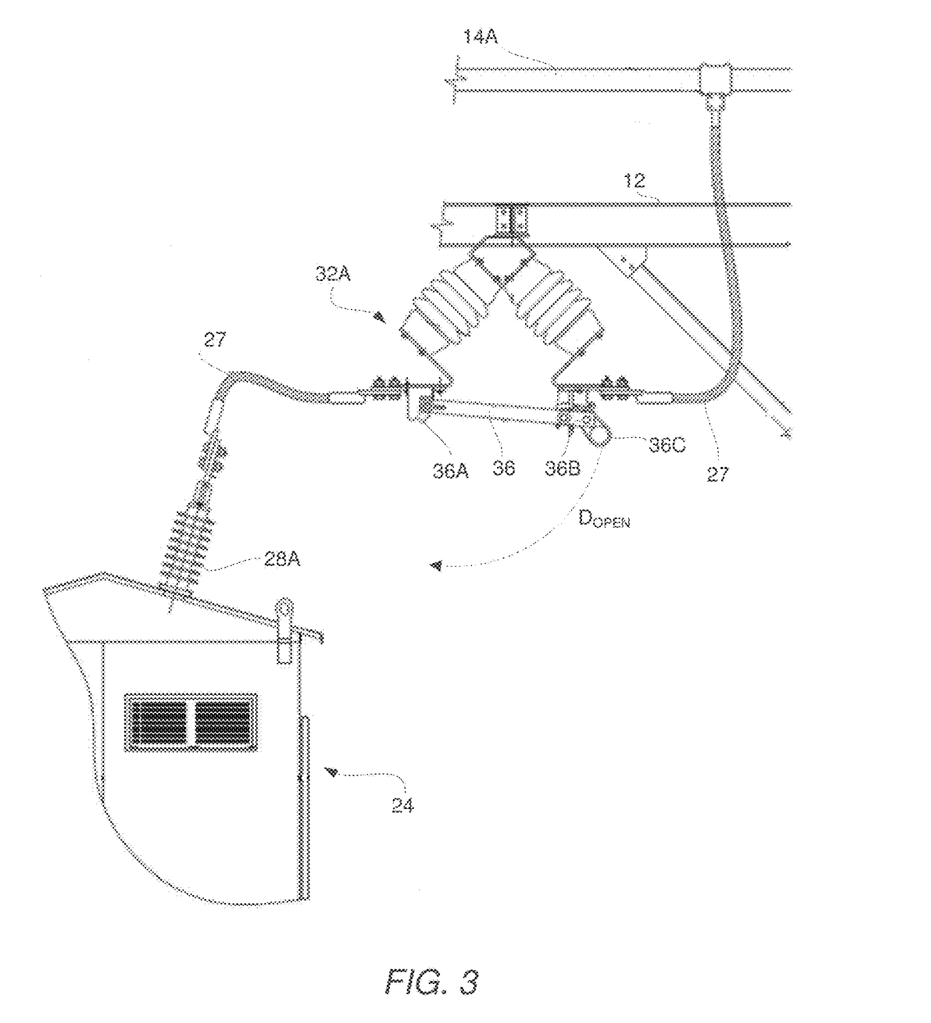
FIG. 3 is a detailed front view of a bus-side portion of the circuit breaker bay of FIG. 1.

In these and other embodiments, the disconnect switches 30A, 32A are placed and oriented to advantageously facilitate switchgear operation and maintenance, e.g., through convenient operation of the disconnect switches 30A, 32A. As shown in FIGS. 2 and 3, for example, the disconnect switches 30A, 32A are each a hookstick operated switch. Each switch 30A, 32A has a switch blade 34, 36 which substantially extends in the bus direction $D_{BUS}$ when the switch is in the closed position, and extends primarily down towards the ground 17 when the switch is in the open position. More particularly, each switch 30A, 32A has a pivot end 34A, 36A and a free end 34B, 36B. The switch blade 34, 36 is configured to move from the closed position to the open position by pivoting via the pivot end 34A, 36A such that the free end 34B, 36B swings in a direction $D_{OPEN}$ away from the bus conductor 14A (i.e., towards the ground 17). Regardless, mounting the switches 30A, 32A from the support structure 12 in this way may facilitate personnel operating the switches 30A, 32A using a hookstick. In fact, in combination with some embodiments above which reduce the vertical footprint of the switchgear, the eye 34C, 36C of each of the hookstick operated switches 30A, 32A may in some embodiments be disposed no more than 15 feet above the ground 17 when the switch blade of the switch 30A, 32A is in the closed position. With the height of the eye at such a relatively low elevation, personnel need only use a hookstick that is around 7-10 feet long, which makes the hookstick easier to guide towards the eye for operating the switch 30A, 32A.

Other embodiments may also exploit the support structure 12 for supporting disconnect switches 30A, 32A, even for switches that are not hookstick operated switches. For example, disconnect switches 30A, 32A may be gang operated switches or remote operated switches, where one or more switch poles are operated by a motor or by hand via an insulated linkage extending to a ground level handle.

Figure 4:
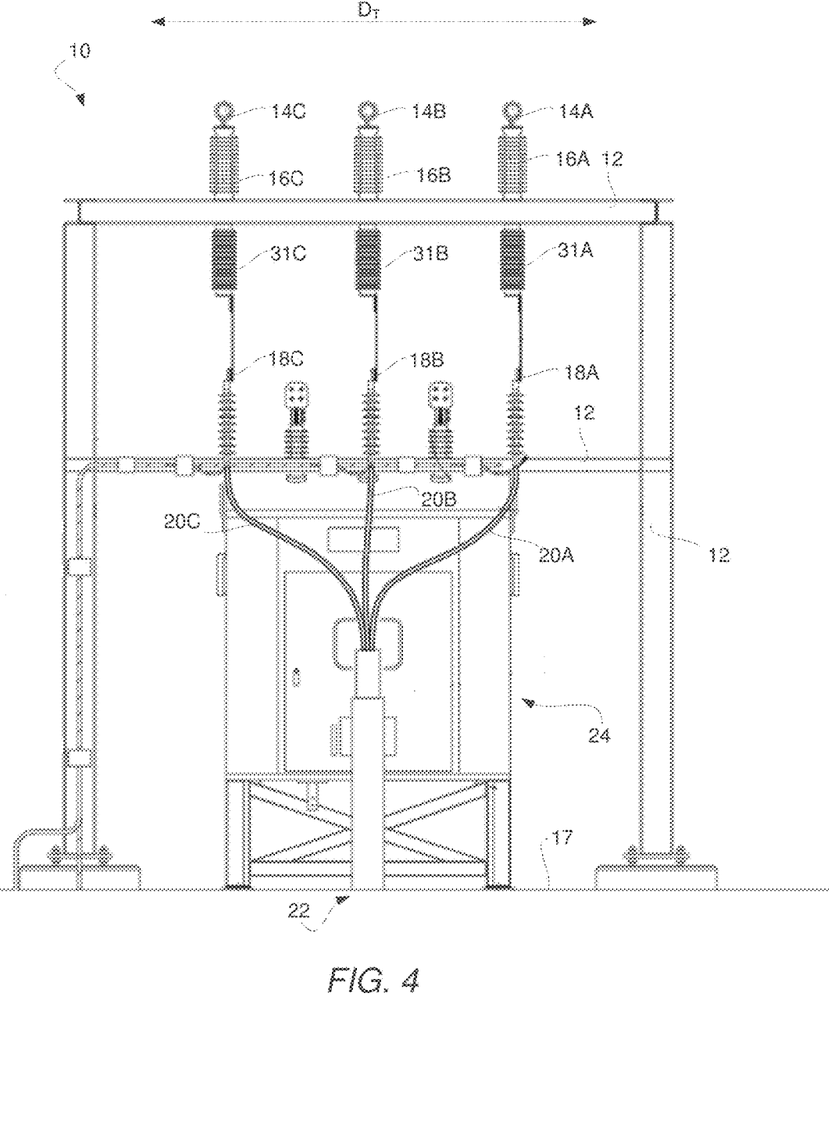
FIG. 4 is an end view of the circuit breaker bay of FIG. 1 according to embodiments that include multiple bus conductors.
Figure 5:
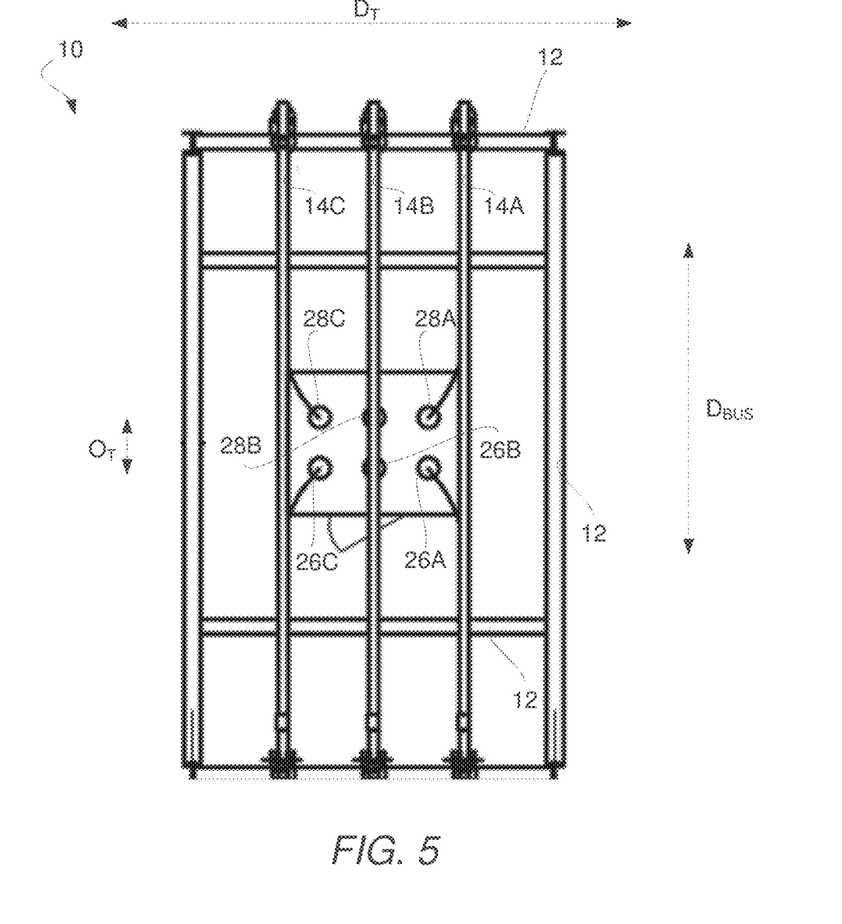
FIG. 5 is a top view of the circuit breaker bay of FIG. 1 according to embodiments that include multiple bus conductors.
Figure 6:
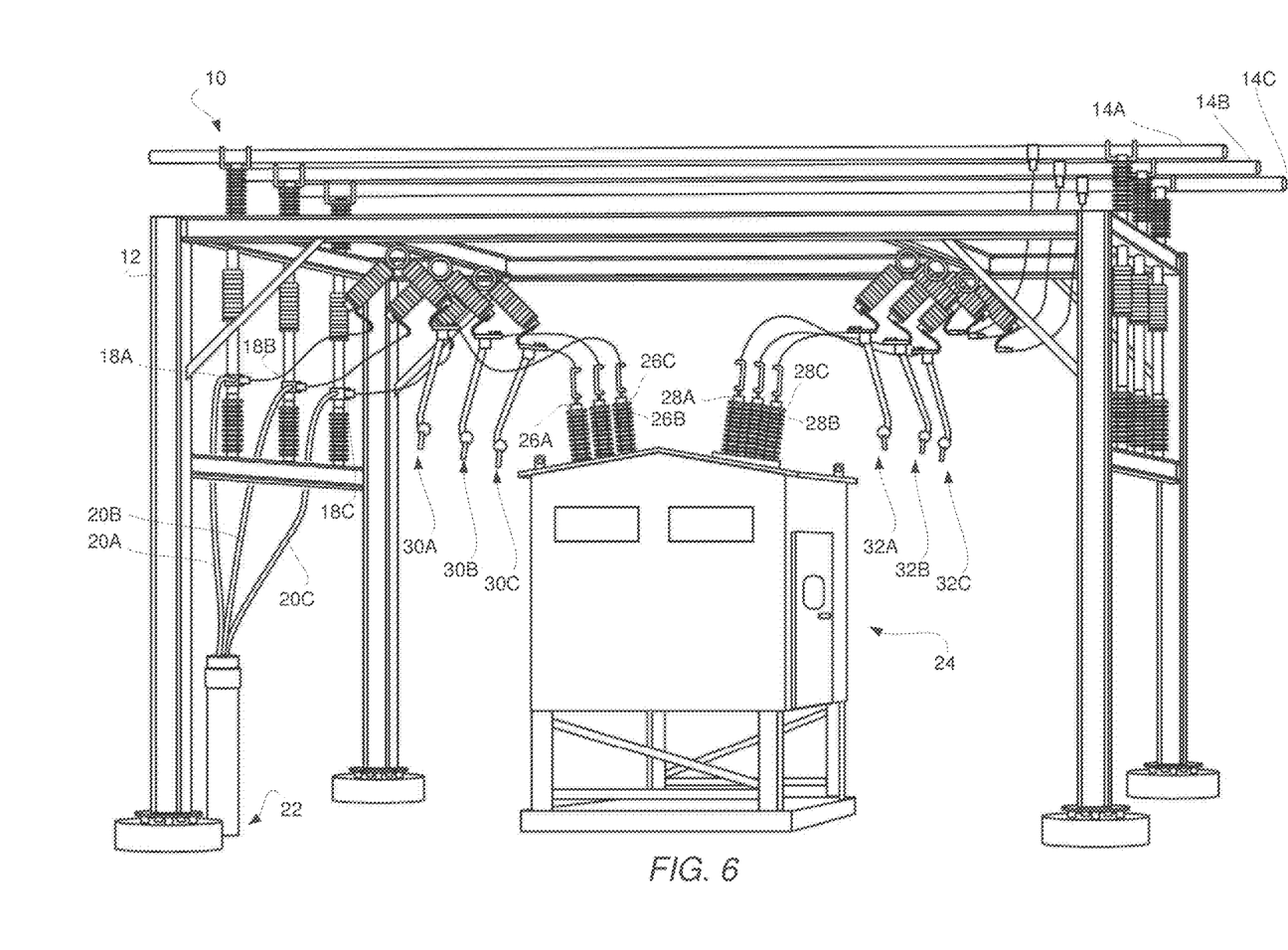
FIG. 6 is perspective view of the circuit breaker bay of FIG. 1 according to embodiments that include multiple bus conductors.

Although FIGS. 1-3 have illustrated various embodiments with reference to one bus conductor 14A, switchgear according to embodiments herein may include one or more bus conductors. FIGS. 4-6 for example respectively show side, top, and perspective views of the switchgear of FIGS. 1-3 according to some embodiments where the switchgear includes multiple bus conductors. The switchgear in one embodiment comprises three-phase alternating current (AC) air-insulated switchgear which includes one bus conductor for each phase. In this case, the components illustrated in FIGS. 1-3 are thrice replicated, once for each phase, in a direction transverse to the bus direction.

As shown in FIGS. 4-6, switchgear 10 according to some embodiments includes multiple bus conductors 14A-14C. Each of the bus conductors 14A-14C extend longitudinally in the bus direction $D_{BUS}$. The conductors 14A-14C however are spaced from one another in a direction $D_T$ transverse to the bus direction $D_{BUS}$, e.g., horizontally perpendicular. This spacing may be dimensioned for instance to meet minimum clearance requirements between the conductors 14A-14C.

As in FIG. 1, FIGS. 4-6 show a single circuit breaker bay 10. But, the circuit breaker bay 10 in FIGS. 4-6 includes multiple feeder cable terminals 18A-18C configured to respectively terminate multiple feeder cables 20A-20C. The circuit breaker 24 is configured to interrupt current between the bus conductors 14A-14C and the respective feeder cable terminals 18A-18C. The circuit breaker 24 is spaced from the feeder cable terminals 18A-18C in the bus direction $D_{BUS}$.

The circuit breaker 24 connects to the feeder terminals 18A-18C via respective feeder-side terminals 26A-26C and connects to bus conductors 14A-14C via respective bus-side terminals 28A-28C. More specifically in this regard, the circuit breaker 24 includes multiple pairs of terminals between which the circuit breaker 24 is configured to interrupt current. The terminal pairs as shown include (i) feeder-side terminal 26A and bus-side terminal 28A; (ii) feeder-side terminal 26B and bus-side terminal 28B; and (iii) feeder-side terminal 26C and bus-side terminal 28C.

FIG. 5 shows that the terminals of each terminal pair are spaced from one another in the bus direction $D_{BUS}$. In particular, the terminals of each terminal pair are separated by an offset $O_T$ in the bus direction $D_{BUS}$. The feeder-side terminals 26A-26C included in different terminal pairs are shown as being spaced from one another in the direction $D_T$ transverse to the bus direction $D_{BUS}$. Similarly, the bus-side terminals 28A-28C included in different terminal pairs are spaced from one another in a direction $D_T$ transverse to the bus direction $D_{BUS}$. In fact, in some embodiments, the terminals of each terminal pair are substantially aligned in the bus direction $D_{BUS}$, whereas the feeder-side terminals 26A-26C included in different terminals pairs are aligned in the transverse direction $D_T$ and the bus-side terminals 28A-28C included in different terminals pairs are aligned in the transverse direction $D_T$.

This spacing and/or alignment in some embodiments facilitates connection from each feeder cable terminal 18A-18C to respective bus conductors 14A-14C generally or primarily flowing in the bus direction $D_{BUS}$. Indeed, in some embodiments, the terminals of each terminal pair are aligned or otherwise oriented such that the feeder cables may be connected to the respective bus conductors using jumper cables 25, 27 that primarily extend (horizontally) in the bus direction $D_{BUS}$. With the connection from the feeder cable terminals to the bus conductors primarily extending in the bus direction $D_{BUS}$, such advantageously minimizes or at least reduces the vertical footprint and thereby construction materials and cost of the switchgear.

FIGS. 4-6 similarly show embodiments that alternatively or additionally run the feeder cables 20A-20C underground all the way to the circuit breaker bay 10 and/or the support structure 12 that supports the bus conductors 14A-14C. Indeed, in some embodiments, the feeder cables 20A-20C are each run under the ground 17 to the same feed point 22 from which the feeder cables 20A-20C emerge and directly connects to respective feeder cable terminals 18A-18C. The feed point 22 in some embodiments is located within the area of ground spanned by the support structure 12 (e.g., within a footprint of the support structure 12 when the support structure 12 is projected straight down onto the ground 17).

FIGS. 4-6 also show embodiments where the support structure 12 supports each of the feeder cable terminals 18A-18C. In particular, the feeder cable terminals 18A-18C may be mounted on and/or from the support structure 12, e.g., via one or more insulators. For instance, the feeder cable terminals 18A-18C are mounted above respective insulators 29A-29C and below respective surge arresters 31A-31C, each of which is supported by the support structure 12.

FIGS. 4-6 further show embodiments where the circuit breaker bay 10 includes multiple feeder-side disconnect switches 30A-30C for disconnecting the circuit breaker 24 from respective feeder cables 18A-18C and multiple bus-side disconnect switches 32A-32C for disconnecting the circuit breaker 24 from respective bus conductors 18A-18C. Feeder-side jumper cables 25 extend longitudinally in the bus direction $D_{BUS}$ and connect the circuit breaker's feeder-side terminals 26A-26C, via the feeder-side disconnect switches 30A-30C, to the feeder cable terminals 18A-18C. Similarly, the bus-side jumper cables 27 extend longitudinally in the bus direction $D_{BUS}$ and connects the circuit breaker's bus-side terminals 28A-28C, via the bus-side disconnect switches 32A-32C, to the bus conductors 14A-14C. The feeder-side disconnect switches 30A-30C are spaced from one another (and may even be aligned with one another) in a direction transverse to the bus direction, and the bus-side disconnect switches 32A-32C are spaced from one another (and may even be aligned with one another) in a direction transverse to the bus direction. Furthermore, the bus-side jumper cables 27 are spaced from one another in a direction transverse to the bus direction and the feeder-side jumper cables 25 are spaced from one another in a direction transverse to the bus direction. In any event, FIG. 6 shows that the disconnect switches 30A-30C, 32A-32C are under-hung from the support structure 12 in a way similar to that described above.

These and other embodiments herein are realized or facilitated through use of a support structure configured to support components of the switchgear. The support structure may be elongated in the bus direction $D_{BUS}$ and otherwise configured so as to minimize or reduce the height at which switchgear components are disposed, e.g., the structure may be 20 feet or less.

Figure 7A:
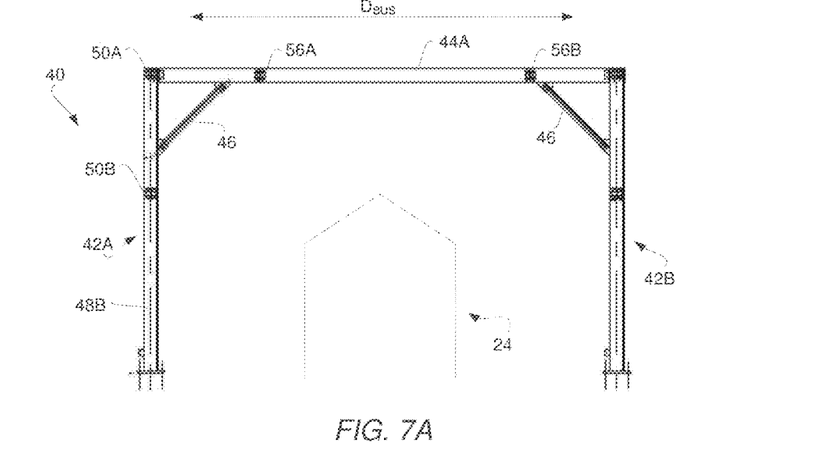
FIG. 7A is a front view of a support structure in the form of a support frame according to some embodiments.
Figure 7B:
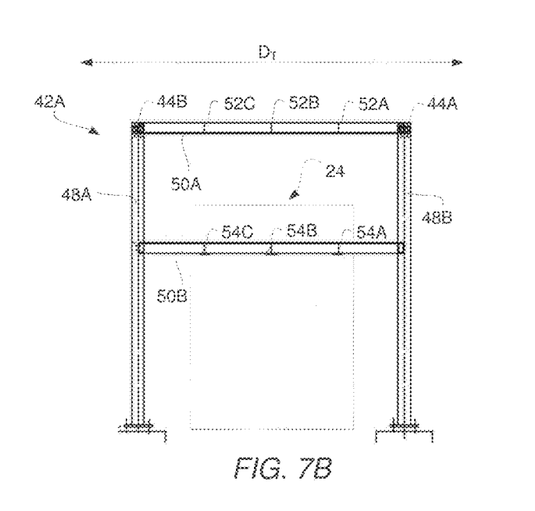
FIG. 7B is an end view of a support structure in the form of a support frame according to some embodiments.
Figure 7C:
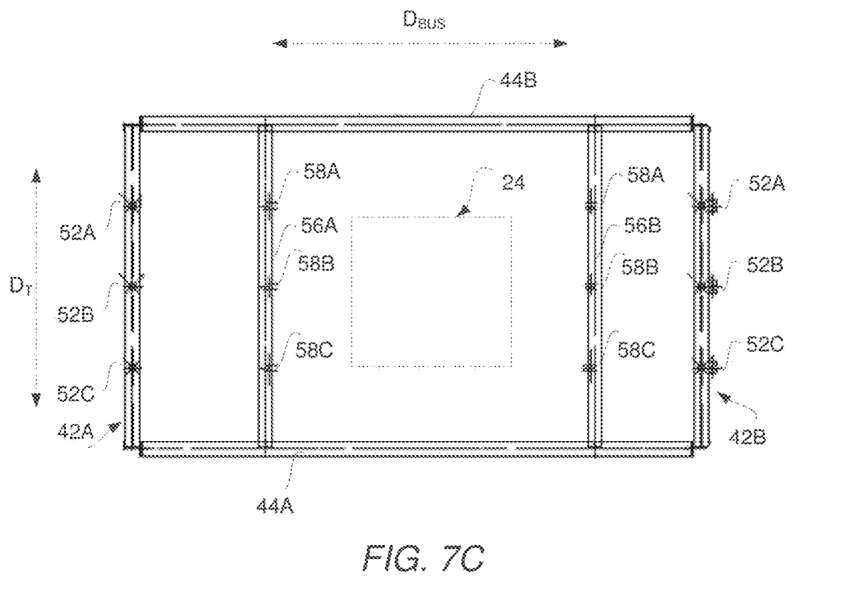
FIG. 7C is a top view of a support structure in the form of a support frame according to some embodiments.

FIGS. 7A-7C illustrate details of a support structure configured for use in supporting switchgear components.

The switchgear components may be arranged and configured as described above with respect to FIGS. 1-5, such that the support structure in FIGS. 7A-7C corresponds to support structure 12, but the support structure in FIGS. 7A-7C is not limited to those embodiments.

FIGS. 7A-7C respectively show a front view, an end view, and a top view of a support structure according to some embodiments in which the structure is a support frame 40. The support frame 40 is configured to support bus conductors that each extend longitudinally in a bus direction $D_{BUS}$. The support frame 40 is formed from a row of (substantially vertical) props that are spaced along the bus direction $D_{BUS}$, e.g., such that each circuit breaker 24 is flanked on opposite sides in the bus direction $D_{BUS}$ by a prop. The props are connected by (substantially horizontal) cross-members. FIGS. 7A and 7C for example show two vertical props 42A and 42B arranged in a row in the bus direction $D_{BUS}$. These vertical props 42A and 42B are connected by cross-members 44A and 44B. The cross-members 44A and 44B each extend in the bus direction $D_{BUS}$. The cross-members 44A and 44B are spaced from one another in a direction $D_T$ transverse to the bus direction $D_{BUS}$ (e.g., horizontally perpendicular). The connection between the vertical props 42A, 42B and the cross-members 44A, 44B may be reinforced in some embodiments with bracing 46.

FIG. 7B shows an end view of vertical prop 42A, with vertical prop 42B being structured in a corresponding way. Vertical prop 42A includes vertical members 48A and 48B. The vertical members 48A, 48B as shown are connected by horizontal members 50A and 50B (although the vertical members 48A, 48B may be connected by only one horizontal member in other embodiments). The horizontal members 50A, 50B extend in the direction $D_T$ transverse to the bus direction $D_{BUS}$. In some embodiments, each of the horizontal members 50A, 50B are shorter in length than the cross-members 44A, 44B. This dimensioning means that the support frame 40 is longer in the bus direction $D_{BUS}$ than in the direction $D_T$ transverse to the bus direction.

The support frame 40 may be configured with bus attachment points 52A-52C to which bus conductors are attachable, e.g., in an insulated manner. For example, the bus attachment points 52A-52C may be configured as attachment points for insulators 16A on which bus conductors 14A-14C are disposed. FIGS. 7B-7C in particular show that the uppermost horizontal member 50A of each vertical prop 42A, 42B includes bus attachment points 52A-52C spaced apart in direction $D_T$, e.g., to satisfy minimum clearance requirements between bus conductors 14A-14C.

The support frame 40 may additionally or alternatively be configured with terminal attachment points 54A-54C to which feeder cable terminals 18A-18C are attachable. The terminal attachment points 54A-54C in some embodiments are mechanical support clamps, which may or may not be insulated. In one or more embodiments, the terminal attachment points 54A-54C may be configured as attachment points for insulators 29A-29C on which feeder cable terminals 18A-18C are disposed. FIGS. 7B-7C in particular show that the lowermost horizontal member 50B of at least vertical prop 42A includes terminal attachment points 54A-54C spaced apart in direction $D_T$, e.g., to satisfy minimum clearance requirements between feeder cable terminals 18A-18C.

The support frame 40 in some embodiments is also configured to support disconnect switches. FIGS. 7A and 7C for example show that the support frame 40 has inner horizontal members 56A and 56B that extend between the cross-members 44A, 44B, e.g., on different sides of a circuit breaker 24 in the bus direction $D_{BUS}$. Disconnect switches may be underhung from these inner horizontal members. To support this, the horizontal members 56A, 56B may each include switch attachment points 58A-58C that are spaced from one another in direction $D_T$. Feeder-side disconnect switches 30A-30C may be underhung from horizontal member 56A via member 56A's respective switch attachment points 58A-58C, while bus-side disconnect switches 32A-32C may be underhung from horizontal member 56B via member 56B's respective switch attachment points 58A-58C.

Figure 8:
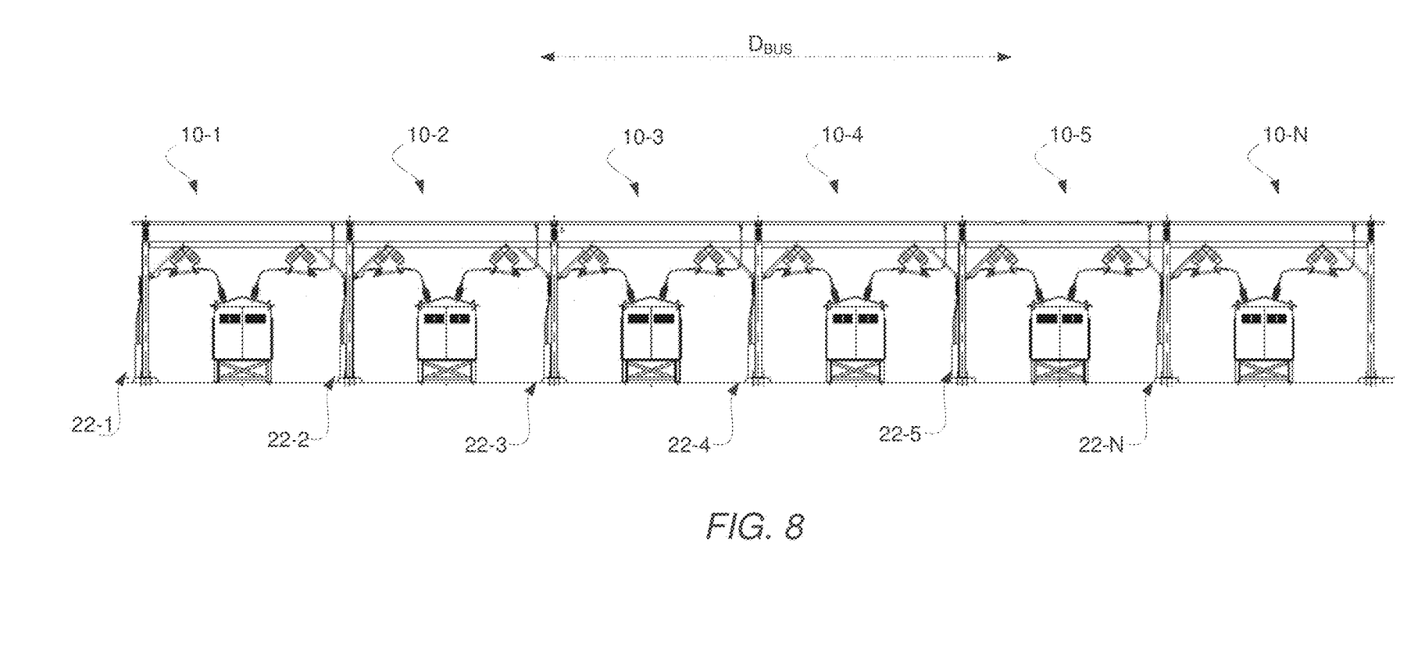
FIG. 8 is a front view of a row of circuit breaker bays according to some embodiments.

Note that although embodiments have been described above with respect to a single circuit breaker bay, embodiments herein extend to switchgear that comprises multiple (repeating) circuit breaker bays. FIG. 8 for example shows switchgear that includes multiple circuit breaker bays 10-1, 10-2, . . . 10-N disposed in a row in the bus direction $D_{BUS}$. Each individual circuit breaker bay 10-n may be configured as shown and described above with respect to FIGS. 1-7, with the bus conductors 14A-14C and the support structure 12 extending along the length of the switchgear in the bus direction $D_{BUS}$. The bus conductors 14A-14C may thereby form a common (main power) bus, with the circuit breaker bays branching from the common bus.

Moreover, at least one feed point from which feeder cable(s) of a circuit breaker bay 10-n emerge may be disposed between that circuit breaker bay and an adjacent circuit breaker bay in the row. FIG. 8 for example shows that the feed point 22-2 from which feeder cable(s) of circuit breaker bay 10-2 emerge is disposed between circuit breaker bays 10-1 and 10-2. Similarly, the feed point 22-3 from which feeder cable(s) of circuit breaker bay 10-3 emerge is disposed between circuit breaker bays 10-2 and 10-3. In this example, then, feed point 22-n is disposed between circuit breaker bays 10-n-1 and 10-n, with the exception of feed point 22-1 since circuit breaker bay 10-1 is on the end with no adjacent bay to the left.

Figure 9:
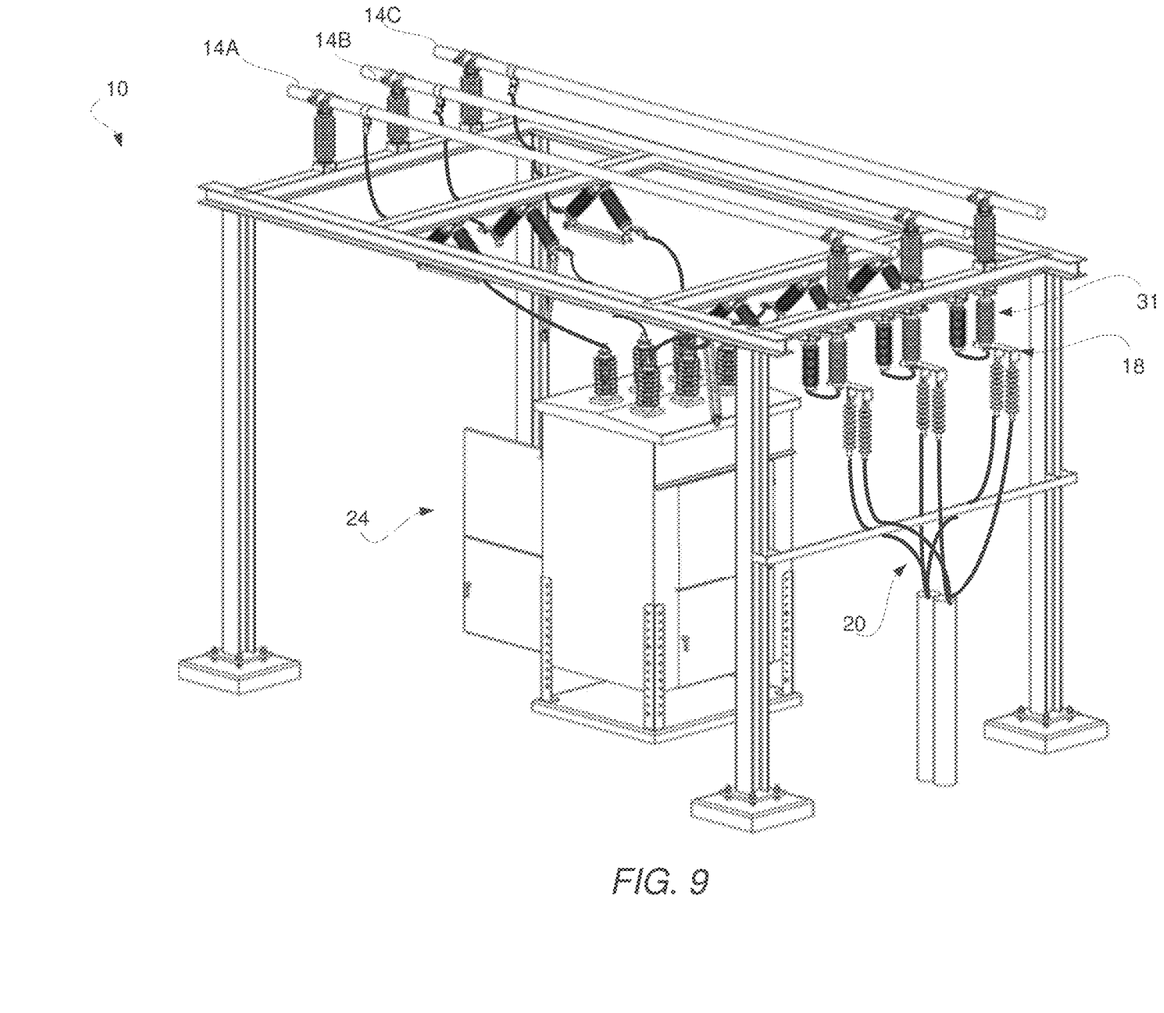
FIG. 9 is a perspective view of a circuit breaker bay of switchgear according to other embodiments.

Furthermore, note that the embodiments above may be implemented in any number of ways that are not limited to those shown. As just one example, FIG. 9 shows a different implementation of the circuit breaker bay 10 which may for instance accommodate multiple parallel feeder cables 20. In this implementation, feeder cable terminals 18 are underhung or mounted from the support structure 12, e.g., via insulators 31. Each feeder cable terminal 18 may accommodate termination of multiple feeder cables 20 in parallel.

Note also that although some embodiments above have referred to disconnect switches as single-pole devices. However, especially when used in two and three phase circuits, the disconnect switches may be collectively referred to as a single disconnect switch. Accordingly, in some embodiments, the switchgear is implemented using multi-pole gang-operated switch devices that are installed and operated as a single unit.

Also note that, in some embodiments, two switchgear components may be spaced from one another in a given direction in the sense that the closest, outermost points of the components are spaced from one another in the given direction, e.g., with a gap therebetween.

Further note that a connection between switchgear components that are conductors may refer to a "local" electrical connection, e.g., within the bounds of the switchgear or circuit breaker bay. Such a connection however may be direct or indirect, e.g., via one or more intermediate conductors within the switchgear.

Accordingly, the present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A switchgear comprising:
   a support structure;
   multiple circuit breaker bays; and
   one or more bus conductors that form a bus common to the multiple circuit breaker bays, that are each supported by the support structure, and that each extend longitudinally in a bus direction;
   wherein each of the multiple circuit breaker bays comprises:
      one or more feeder cable terminals configured to respectively terminate one or more feeder cables; and
      a circuit breaker that is spaced from the one or more feeder cable terminals in the bus direction, that comprises one or more terminal pairs with each pair including a bus-side terminal via which the circuit breaker connects to a respective one of the one or more bus conductors and a feeder-side terminal via which the circuit breaker connects to a respective one of the one or more feeder cable terminals, and that is configured to selectively interrupt current between the bus-side terminal and the feeder-side terminal of each of the one or more terminal pairs, wherein the bus-side terminal and the feeder-side terminal of each of the one or more terminal pairs are spaced from one another in the bus direction.

2. The switchgear of claim 1, wherein the one or more bus conductors comprise multiple bus conductors spaced from one another in a direction transverse to the bus direction and wherein each of the multiple circuit breaker bays comprises multiple ones of the one or more feeder cable terminals configured to respectively terminate multiple feeder cables, wherein the circuit breaker of each of the multiple circuit breaker bays comprises multiple terminal pairs, wherein the bus-side terminals included in different terminal pairs are spaced from one another in a direction transverse to the bus direction, and wherein the feeder-side terminals included in different terminal pairs are spaced from one another in a direction transverse to the bus direction.

3. The switchgear of claim 1, wherein the circuit breaker of each of the multiple circuit breaker bays comprises multiple terminal pairs, wherein the bus-side terminal and the feeder-side terminal of each of the terminal pairs are aligned in the bus direction, wherein the bus-side terminals included in different terminal pairs are aligned in a direction transverse to the bus direction, and wherein the feeder-side terminals included in different terminal pairs are aligned in a direction transverse to the bus direction.

4. The switchgear of claim 1, wherein, for each of the multiple circuit breaker bays, the one or more feeder cables are each fed under ground to a feed point from which the one or more feeder cables emerge and directly connect to a respective one of the one or more feeder cable terminals, wherein the feed point is located under the one or more bus conductors, and wherein the one or more feeder cable terminals are each supported by the support structure that supports the one or more bus conductors extending in the bus direction.

5. The switchgear of claim 1, wherein each of the multiple circuit breaker bays further comprises at least one of:

one or more feeder-side disconnect switches and one or more feeder-side jumper cables extending longitudinally in the bus direction, wherein the one or more feeder-side jumper cables are configured to respectively connect one or more feeder-side terminals of the circuit breaker, via the one or more feeder-side disconnect switches, to the one or more feeder cable terminals; or one or more bus-side disconnect switches and one or more bus-side jumper cables extending longitudinally in the bus direction, wherein the one or more bus-side jumper cables are configured to respectively connect one or more bus-side terminals of the circuit breaker, via the one or more bus-side disconnect switches, to the one or more bus conductors.

6. The switchgear of claim 5, wherein each of the multiple circuit breaker bays comprises multiple feeder-side disconnect switches including the one or more feeder-side disconnect switches, multiple bus-side disconnect switches including the one or more bus-side disconnect switches, multiple feeder-side jumper cables including the one or more feeder-side jumper cables, and multiple bus-side jumper cables including the one or more bus-side jumper cables, wherein the multiple feeder-side disconnect switches are spaced from one another in a direction transverse to the bus direction and the multiple bus-side disconnect switches are spaced from one another in a direction transverse to the bus direction, and wherein the multiple bus-side jumper cables are spaced from one another in a direction transverse to the bus direction and the multiple feeder-side jumper cables are spaced from one another in a direction transverse to the bus direction.

7. The switchgear of claim 5, wherein each of the one or more bus-side disconnect switches and each of the one or more feeder-side disconnect switches are underhung from the support structure.

8. The switchgear of claim 5, wherein each of the one or more bus-side disconnect switches and each of the one or more feeder-side disconnect switches comprise a hookstick operated switch that has a switch blade which extends in the bus direction when the switch blade is in a closed position.

9. The switchgear of claim 5, wherein each of the one or more bus-side disconnect switches and each of the one or more feeder-side disconnect switches comprise a hookstick operated switch mounted from the support structure such that an eye of the hookstick operated switch is disposed no more than 15 feet above a bottom of the support structure when a switch blade of the hookstick operated switch is in a closed position.

10. The switchgear of claim 1, wherein the support structure comprises a support frame formed from a row of vertical props connected by cross-members, wherein the cross-members extend in the bus direction and are spaced from one another in the direction transverse to the bus direction, wherein each vertical prop comprises vertical members connected by one or more horizontal members extending in the direction transverse to the bus direction, wherein each of the one or more horizontal members are shorter in length than the cross-members, wherein each of the multiple circuit breaker bays of the switchgear has a vertical prop on opposite sides of the circuit breaker in the bus direction.

11. The switchgear of claim 1, wherein the support structure has a height that is no more than 20 feet.

12. The switchgear of claim 1, wherein each of the multiple circuit breaker bays further comprises one or more disconnect switches underhung from the support structure.

13. The switchgear of claim 12, wherein each of the one or more disconnect switches comprise a hookstick operated switch that has a switch blade which extends in the bus direction when the switch blade is in a closed position.

14. A switchgear comprising:
multiple circuit breaker bays;
one or more bus conductors that form a bus common to the multiple circuit breaker bays and that each extend longitudinally in a bus direction; and
a support structure that supports the one or more bus conductors;
wherein each of the multiple circuit breaker bays comprises:
one or more feeder cable terminals that are supported by the support structure and that are configured to respectively terminate one or more feeder cables that are fed under ground to a feed point from which the one or more feeder cables emerge and directly connect to a respective feeder cable terminal, wherein the feed point is located within an area of ground spanned by the support structure; and
a circuit breaker that is located within the area of ground spanned by the support structure, that is spaced from the one or more feeder cable terminals in the bus direction, and that is configured to interrupt current between the one or more bus conductors and the one or more feeder cable terminals.

15. The switchgear of claim 14, wherein the support structure comprises a support frame formed from a row of vertical props connected by cross-members, wherein the cross-members extend in the bus direction and are spaced from one another in the direction transverse to the bus direction, wherein each vertical prop comprises vertical members connected by one or more horizontal members extending in the direction transverse to the bus direction, wherein each of the one or more horizontal members are shorter in length than the cross-members, wherein each of the multiple circuit breaker bays of the switchgear has a vertical prop on opposite sides of the circuit breaker in the bus direction.

16. The switchgear of claim 15, wherein, for each circuit breaker, the support frame further has inner horizontal members that extend between the cross-members on different sides of the circuit breaker, and wherein each of the multiple circuit breaker bays further comprises at least one of:
feeder-side disconnect switches that are each underhung from one of the inner horizontal members and that each comprise a feeder-side hookstick operated switch that has a feeder-side switch blade which extends in the bus direction when the feeder-side switch blade is in a closed; or
bus-side disconnect switches that are each underhung from the one or another one of the inner horizontal members and that each comprise a bus-side hookstick operated switch that has a bus-side switch blade which extends in the bus direction when the bus-side switch blade is in a closed position.

17. The switchgear of claim 14, wherein the multiple circuit breaker bays are disposed in a row in the bus direction, wherein at least one feed point from which the one or more feeder cables of a respective one of the multiple circuit breaker bays emerge is disposed at a boundary between the respective one of the multiple circuit breaker bays and an adjacent one of the multiple circuit breaker bays in the row.

18. The switchgear of claim 14, wherein the support structure has a height that is no more than 20 feet.

19. The switchgear of claim 14, wherein each of the multiple circuit breaker bays further comprises one or more disconnect switches underhung from the support structure.

20. The switchgear of claim 19, wherein each of the one or more disconnect switches comprise a hookstick operated switch that has a switch blade which extends in the bus direction when the switch blade is in a closed position.

21. Switchgear comprising:
multiple circuit breaker bays;
bus conductors that form a bus common to the multiple circuit breaker bays, that each extend longitudinally in a bus direction, and that are spaced from one another in a direction transverse to the bus direction; and
a support structure configured to support the bus conductors, wherein the support structure comprises a support frame formed from a row of vertical props that are spaced along the bus direction and that are connected by cross-members, wherein the cross-members extend in the bus direction and are spaced from one another in the direction transverse to the bus direction, wherein each vertical prop comprises vertical members connected by one or more horizontal members extending in the direction transverse to the bus direction, wherein each of the one or more horizontal members are shorter in length than the cross-members;
wherein each of the multiple circuit breaker bays comprises:
feeder cable terminals configured to respectively terminate feeder cables; and
a circuit breaker that is spaced from the feeder cable terminals in the bus direction and that is configured to interrupt current between the bus conductors and the feeder cable terminals, wherein the circuit breaker has a vertical prop on opposite sides of the circuit breaker in the bus direction.

22. The switchgear of claim 21, wherein, for each circuit breaker, the support frame further has inner horizontal members that extend between the cross-members on different sides of the circuit breaker, and wherein each of the multiple circuit breaker bays further comprises:
feeder-side disconnect switches that are each underhung from one of the inner horizontal members and that each comprise a feeder-side hookstick operated switch that has a feeder-side switch blade which extends in the bus direction when the feeder-side switch blade is in a closed position; or
bus-side disconnect switches that are each underhung from the one or another one of the inner horizontal members and that each comprise a bus-side hookstick operated switch that has a bus-side switch blade which extends in the bus direction when the bus-side switch blade is in a closed position.

23. The switchgear of claim 21, wherein the support structure has a height that is no more than 20 feet.

\* \* \* \* \*